(12) United States Patent
Kim (10) Patent No.: US 10,279,850 B2
(45) Date of Patent: May 7, 2019

(54) SIDE STRUCTURE OF BUS

(71) Applicants: Hyundai Motor Company, Seoul (KR); Kia Motors Corporation, Seoul (KR)

(72) Inventor: Jong Min Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/789,491

(22) Filed: Oct. 20, 2017

(65) Prior Publication Data

US 2018/0141593 A1    May 24, 2018

(30) Foreign Application Priority Data

Nov. 22, 2016   (KR) .................... 10-2016-0155590

(51) Int. Cl.
  *B62D 21/11*   (2006.01)
  *B62D 31/02*   (2006.01)
  *B62D 47/02*   (2006.01)
  *B62D 65/02*   (2006.01)

(52) U.S. Cl.
  CPC ............ *B62D 31/025* (2013.01); *B62D 21/11* (2013.01); *B62D 31/02* (2013.01); *B62D 47/02* (2013.01); *B60G 2300/14* (2013.01); *B60G 2300/38* (2013.01); *B62D 65/02* (2013.01)

(58) Field of Classification Search
  CPC ........ B62D 21/08; B62D 21/11; B62D 31/02; B62D 31/025; B62D 47/02; B60G 2300/14

USPC ........................................................ 296/178
See application file for complete search history.

(56) References Cited

U.S. PATENT DOCUMENTS

| | | | | |
|---|---|---|---|---|
| 1,673,786 A | * | 6/1928 | Warhus ................. | B62D 25/00 296/178 |
| 2,356,690 A | * | 8/1944 | Perkins ................. | B62D 31/02 296/182.1 |
| 2,722,987 A | * | 11/1955 | Dean ...................... | B60G 11/26 180/291 |
| 4,274,190 A | * | 6/1981 | Slattery ................. | B62D 31/02 29/401.1 |

(Continued)

FOREIGN PATENT DOCUMENTS

| | | |
|---|---|---|
| CN | 202279156 U | 6/2012 |
| CN | 102582689 A | 7/2012 |

(Continued)

*Primary Examiner* — Gregory A Blankenship
(74) *Attorney, Agent, or Firm* — Slater Matsil, LLP (57) ABSTRACT

A side structure of a bus includes a skirt rail. Window fillers are connected to the skirt rail at lower ends, extend in an upper side, and are arranged from a front to a rear with a predetermined interval. A waist rail extends from the front to the rear with a predetermined distance in the upper side of the skirt rail and is engaged with each of the window fillers. A first region includes a first member connecting the waist rail and the skirt rail and a second member connecting the upper part of the first member and the lower end of the window filler. A second region includes a third member connecting the waist rail and the skirt rail and a fourth member connecting the upper of the third member and the lower part of the window filler.

18 Claims, 6 Drawing Sheets

(56) References Cited

U.S. PATENT DOCUMENTS

| | | | |
|---|---|---|---|
| 7,523,978 B1 * | 4/2009 | Timmermans | B62D 25/06 296/178 |
| 2005/0227539 A1 * | 10/2005 | Timmermans | B62D 31/02 439/607.41 |
| 2006/0049670 A1 * | 3/2006 | Beaudry | B62D 21/18 296/203.01 |
| 2008/0116714 A1 * | 5/2008 | Timmermans | B62D 25/06 296/178 |
| 2017/0174269 A1 * | 6/2017 | Farhadi | B60P 3/0252 |
| 2017/0216112 A1 * | 8/2017 | Hines | B62D 31/02 |
| 2018/0099702 A1 * | 4/2018 | Passone | B62D 25/00 |
| 2018/0141593 A1 * | 5/2018 | Kim | B62D 21/11 |

FOREIGN PATENT DOCUMENTS

| | | | | |
|---|---|---|---|---|
| DE | 102009009545 | * | 3/2010 | B62D 31/02 |
| FR | 2188549 | * | 1/1974 | B62D 31/02 |
| KR | 1020010066512 A | | 7/2001 | |
| KR | 1020040085292 A | | 10/2004 | |
| KR | 1020120000363 A | | 1/2012 | |
| KR | 1020120112945 A | | 10/2012 | |

\* cited by examiner

SIDE STRUCTURE OF BUS

CROSS-REFERENCE TO RELATED APPLICATIONS

This application claims priority to and the benefit of Korean Patent Application No. 10-2016-0155590 filed in the Korean Intellectual Property Office on Nov. 22, 2016, the entire contents of which are incorporated herein by reference.

TECHNICAL FIELD

The present invention relates to a side structure of a bus.

BACKGROUND

As an ultra-low floor bus does not have doorway stairs compared to an existing city bus and a bottom is flat, an ultra-low floor bus is a vehicle that is developed specially for convenient use by vulnerable people such as elderly people and pregnant women.

However, as a height of a floor bottom is lowered in the ultra-low floor bus, a CNG (compressed natural gas) tank is mounted on a roof, and the ultra-low floor bus becomes heavy by about two tons compared with the general city bus to reinforce a raised mass center and a roof structure such that a fuel consumption as 1.7 KM/M$^3$ is reduced by about 23% compared with the fuel consumption of the general city bus as 2.2 KM/M$^3$.

On the other hand, a vehicle price is more expensive than the general city bus in the ultra-low floor bus, and customer complaints are high due to a low fuel consumption efficiency for the vehicle price. Accordingly, a weight reduction is indispensable to improve the fuel consumption of the ultra-low floor bus.

Patent documents Korean Patent Publication No. 10/2001/0066512 and Korean Patent Publication No. 10/2004/0085292 disclose subject matter that is related to subject matter disclosed herein.

The above information disclosed in this Background section is only for enhancement of understanding of the background of the invention and therefore it may contain information that does not form the prior art that is already known in this country to a person of ordinary skill in the art.

SUMMARY

Embodiments of the present invention relate to a side structure of a bus for effectively dispersing a vertical load and reducing a twist of a vehicle body. For example, embodiments provide a side structure of a bus for effectively supporting the vertical load applied to the side structure, effectively supporting a twist applied to the side structure, and effectively dispersing a forward and backward direction load.

A side structure of a bus according to an exemplary embodiment of the present invention includes a skirt rail disposed to extend before and after a vehicle body at a lower part. Window fillers are connected to the skirt rail at lower ends, extend in an upper side, and are arranged from a front to a rear with a predetermined interval. A waist rail extends from the front to the rear with a predetermined distance in the upper side of the skirt rail and is engaged with each of the window fillers. Regions between the skirt rail, the waist rail, and the window fillers include a first region adjacent a front wheel, a second region adjacent to a middle door disposed between the front wheel and a rear wheel, and a third region adjacent to the rear wheel. The first region includes a first member connecting the waist rail and the skirt rail and a second member connecting the upper part of the first member and the lower end of the window filler. The second region includes a third member connecting the waist rail and the skirt rail and a fourth member connecting the upper of the third member and the lower part of the window filler. The third region includes a fifth member connecting the waist rail and the skirt rail and a sixth member connecting the window filler adjacent to each other in a front/rear direction.

The first member may extend in the lower side to the upper side, and the first member may be inclined toward the front of the vehicle.

A roof rail extending from the front to the rare at the upper part with the predetermined distance for the waist rail and connected to each upper end of the window fillers may be further included.

The third member may extend from the lower part to the upper part, and the third member may be inclined toward the front of the vehicle.

The fifth member may be disposed in a vertical direction, and the sixth member may be disposed in a horizontal direction.

The fifth member and the sixth member may be crossed in a crossed shape, and the crossed parts thereof are coupled to each other.

The fourth member may connect the lower parts of the window fillers at the upper ends of the third member, and the fourth member may be inclined toward the rare of the vehicle.

The first region adjacent to the front wheel may effectively support the vertical load applied to the side structure.

Also, the second region corresponding to the middle door of the bus may effectively support the twist applied to the side structure.

Also, the third region corresponding to the rear wheel of the bus may effectively disperse the load in the back/forth direction.

The following reference numbers can be used with the drawings:

| | |
|---|---|
| 100: front wheel | 105: rear wheel |
| 110: skirt rail | 115: waist rail |
| 120: roof rail | 125: window filler |

| | |
|---|---|
| 130: side member | 132: first region |
| 132a: first member | 132b: second member |
| 134: second region | 134a: third member |
| 134b: fourth member | 136: third region |
| 136a: fifth member | 136b: sixth member |
| 150: middle door | 160: middle door frame |

DETAILED DESCRIPTION OF ILLUSTRATIVE EMBODIMENTS

Exemplary embodiments of the present invention will be described hereafter in detail with reference to the accompanying drawings.

Further, the sizes and thicknesses of the configurations shown in the drawings are provided selectively for the convenience of description, such that the present invention is not limited to those shown in the drawings and the thicknesses are exaggerated to make some parts and regions clear.

The unrelated parts to the description of the exemplary embodiments are not shown to make the description clear and like reference numerals designate like element throughout the specification.

Using the terms of the first and the second etc. is for discriminating the components having the same name and they are not limited to the order.

Figure 1:
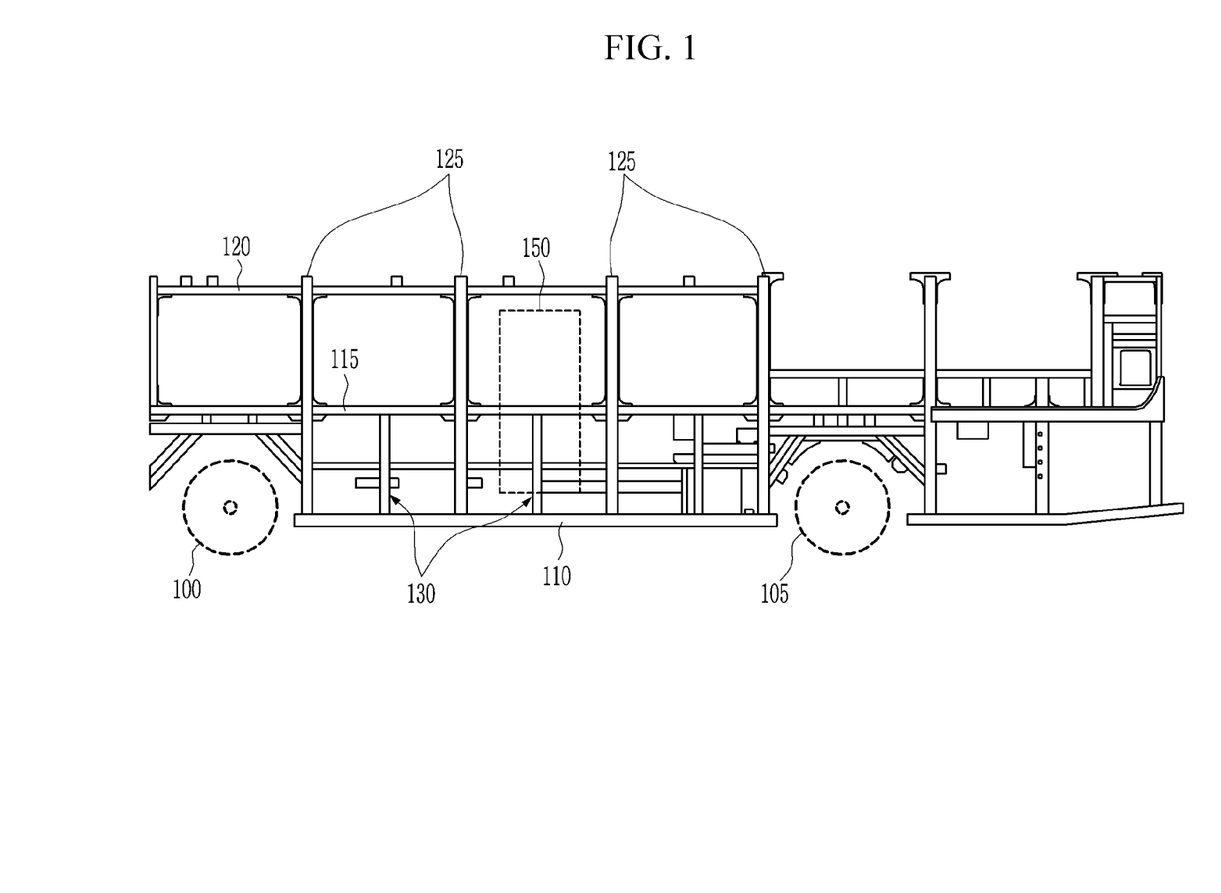
FIG. 1 is a schematic diagram of a side structure of a bus according to the present invention.

FIG. 1 is a schematic diagram of a side structure of a bus related to the present invention.

Referring to FIG. 1, a side structure of a bus includes a skirt rail 110, a window filler 125, a waist rail 115, a middle door 150, a front wheel 100, and a rear wheel 105.

The skirt rail 110 extends from a front side to a rare side at a lower part of a vehicle body and is formed between the front wheel 100 and the rear wheel 105.

The waist rail 115 is disposed by a predetermined distance for the skirt rail 110 and is formed past the upper part of the rear wheel 105 from the front wheel 100 at the upper side of the skirt rail 110.

The roof rail 120 is disposed by the predetermined distance for the waist rail 115 and is formed at the upper side of the waist rail 115.

The lower end of the window filler 125 is connected to the skirt rail 110, the upper end thereof is connected to the roof rail 120, and a middle part thereof is connected to the waist rail 115 and is arranged with the predetermined interval in the front/back direction of the vehicle.

Also, the side member 130 is disposed in each region formed by the skirt rail 110, the waist rail 115, and the window filler 125.

Figure 2:
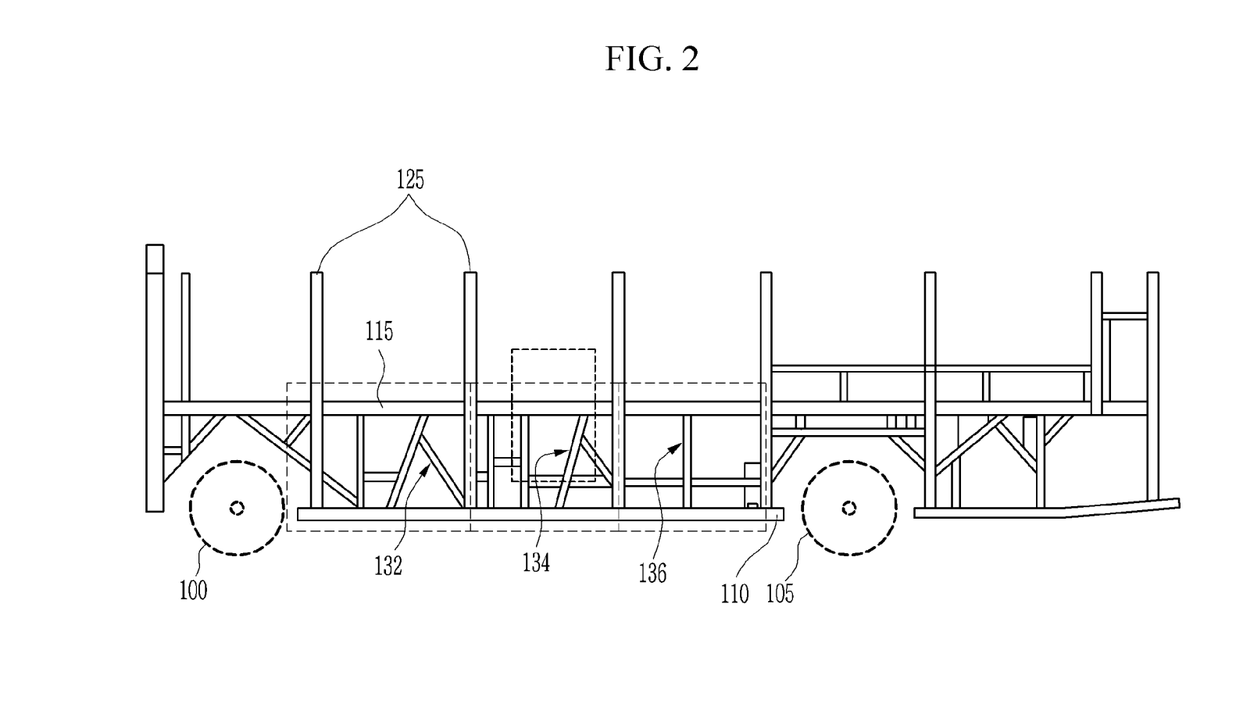
FIG. 2 is a side view of a side structure of a bus according to an exemplary embodiment of the present invention.

FIG. 2 is a side view of a side structure of a bus according to an exemplary embodiment of the present invention.

Referring to FIG. 2, the side structure of the bus includes the front wheel 100, the rear wheel 105, the middle door 150, the skirt rail 110, the waist rail 115, the window filler 125, the first region 132, the second region 134, and the third region 136.

The skirt rail 110 extends in the front/rear direction at the lower part of the vehicle body and is disposed between the front wheel 100 and the rear wheel 105.

The waist rail 115 is disposed by the predetermined distance for the skirt rail 110 at the upper side of the skirt rail 110 and is formed past the rear wheel 105 and the front wheel 100.

The lower end of the window filler 125 is connected to the skirt rail 110, and the middle part is connected to the waist rail 115 and is arranged with the predetermined interval in the front/rear direction of the vehicle.

The first region 132 as a region adjacent to the front wheel 100 between the front wheel 100 and the rear wheel 105 is formed by the waist rail 115, the window filler 125, and the skirt rail 110.

The second region 134 as a side region of a side opposite to the middle door 150 between the front wheel 100 and the rear wheel 105 is formed by the waist rail 115, the window filler 125, and the skirt rail 110.

Also, the third region 136 as a region adjacent to the rear wheel 105 between the front wheel 100 and the rear wheel 105 is formed by the waist rail 115, the window filler 125, and the skirt rail 110.

Figure 3:
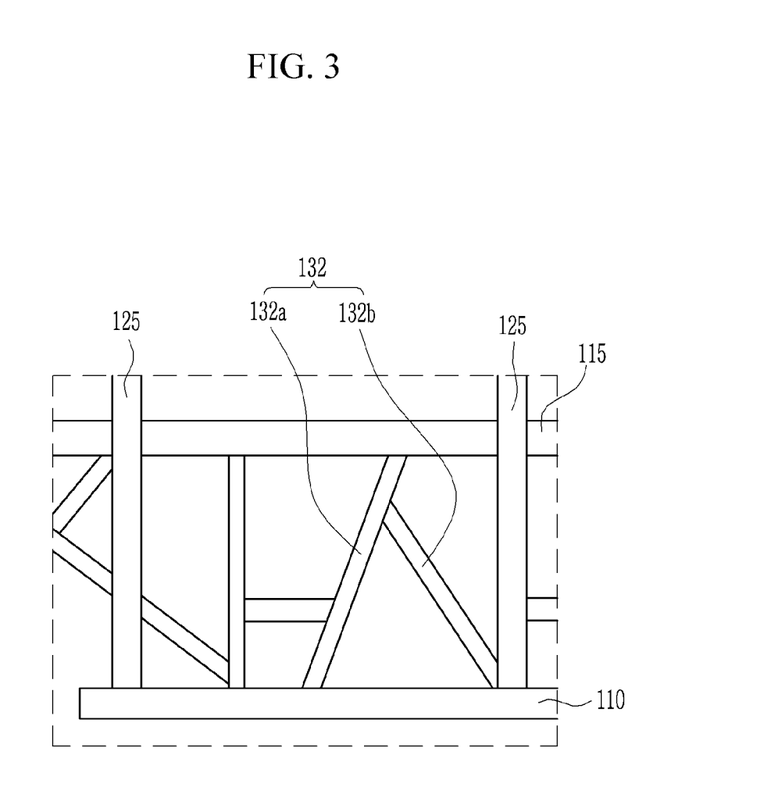
FIG. 3 is a partial side view of a first region of a side structure of a bus according to an exemplary embodiment of the present invention.

FIG. 3 is a partial side view of a first region of a side structure of a bus according to an exemplary embodiment of the present invention. Referring to FIG. 3, the first region 132 includes a first member 132a and a second member 132b.

The lower end of the first member 132a is connected to the skirt rail 110, and the upper end thereof is connected to the waist rail 115.

Here, the first member 132a is inclined in one direction and connects the waist rail 115 and the skirt rail 110. For example, the first member 132a may be inclined toward the front direction of the vehicle to connect the waist rail 115 and the skirt rail 110.

That is, at an imaginary vertical line passing a connection position to which the first member 132a is connected, the first member 132a is inclined in a clockwise direction with respect to the connection position.

The upper end of the second member 132b is connected to the upper part of the first member 132a, and the lower end thereof is connected to the skirt rail 110. The second member 132b is inclined in the other direction and connects the first member 132a and the skirt rail 110. For example, the second member 132b is inclined toward the rear direction of the vehicle to connect the first member 132a and the skirt rail 110.

Accordingly, the first and second members 132a and 132b has an arrangement structure of an inclined "T" letter.

The first region 132 is positioned directly at rear direction of the suspension of the front wheel 100 and is a part to which a vertical load transmitted from the suspension is largely applied thereby being advantage to suppler the vertical load through the above-described structure.

Figure 4:
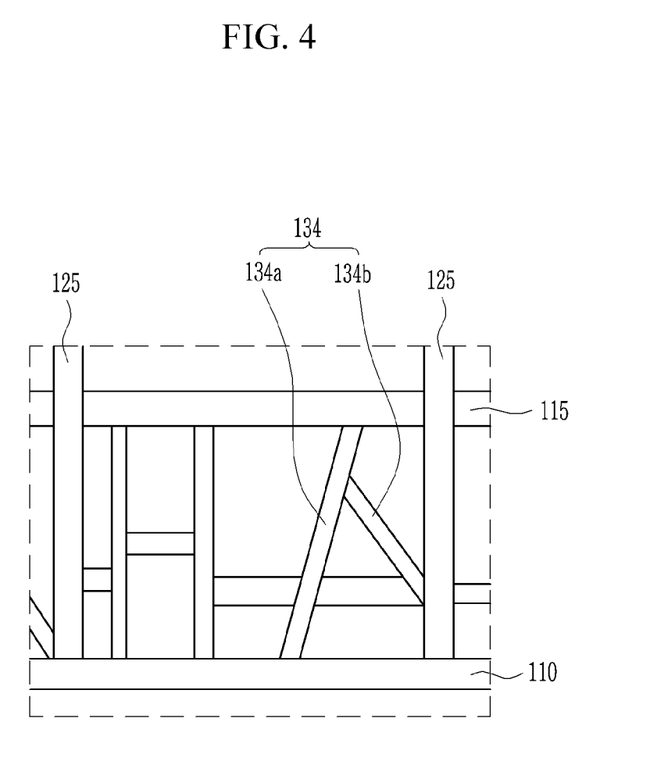
FIG. 4 is a partial side view of a second region of a side structure of a bus according to an exemplary embodiment of the present invention.

FIG. 4 is a partial side view of a second region of a side structure of a bus according to an exemplary embodiment of the present invention.

Referring to FIG. 4, the second region 134 includes a third member 134a and a fourth member 134b.

The third member 134a is inclined in one direction and connects the waist rail 115 and the skirt rail 110. For example, the third member 134a may be inclined toward the front direction of the vehicle to connect the waist rail 115 and the skirt rail 110.

The lower end of the third member 134a is connected to the skirt rail 110 and the upper end thereof is connected to the waist rail 115.

Here, in the imaginary vertical line passing the connection position in which the skirt rail no and the third member 134a are connected, the third member 134a is inclined in the clockwise direction with the predetermined angle with respect to the connection position.

The upper end of the fourth member 134b is connected to the upper part of the third member 134a, and the lower end thereof is connected to the lower part of the window filler 125. The fourth member 134b is inclined in the other direction and connects the third member 134a and the window filler 125. For example, the fourth member 134b is inclined toward the rear of the vehicle to connect the third member 134a and the window filler 125.

Accordingly, the first and second members 132a and 132b have the arrangement structure of the "T" letter.

The second region 134 as the structure preventing the opening from being twisted in the side opposite to the doorway of the bus middle door 150 is advantage to support the torsion load through the above-described structure.

Figure 5:
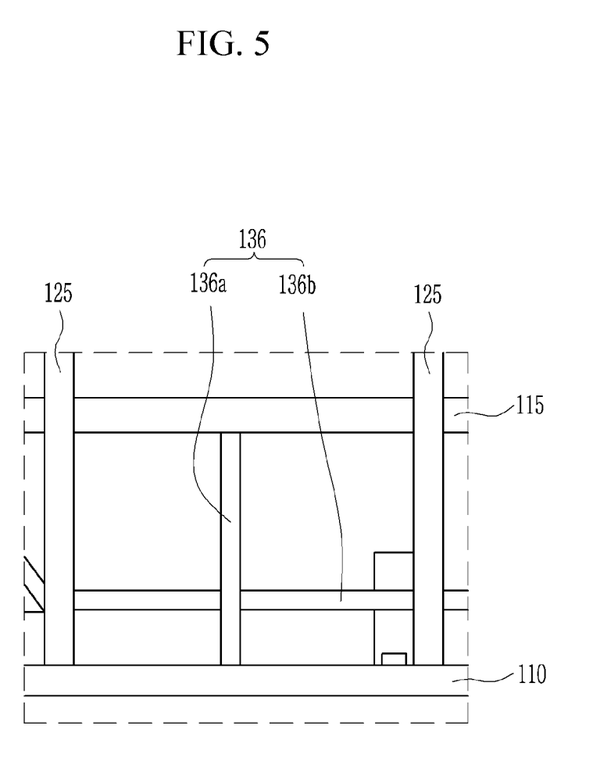
FIG. 5 is a partial side view of a third region of a side structure of a bus according to an exemplary embodiment of the present invention.

FIG. 5 is a partial side view of a third region of a side structure of a bus according to an exemplary embodiment of the present invention.

Referring to FIG. 5, the third region 136 includes a fifth member 136a and a sixth member 136b.

The lower end of the fifth member 136a is connected to the skirt rail 110 and the upper end thereof is connected to the waist rail 115. Here, the fifth member 136a is vertically disposed.

The sixth member 136b is disposed in the horizontal direction and is connected to the window filler 125 and the fifth member 136a that are disposed in the front direction and the rear direction. Accordingly, the fifth and sixth members 136a and 136b have the arrangement structure of a "+" letter.

The third region 136 as the part directly front the suspension of the rear wheel 105 is the part to which the vertical load transmitted from the suspension is largely applied and is advantage to disperse and support the vertical load through the above-described structure.

Figure 6:
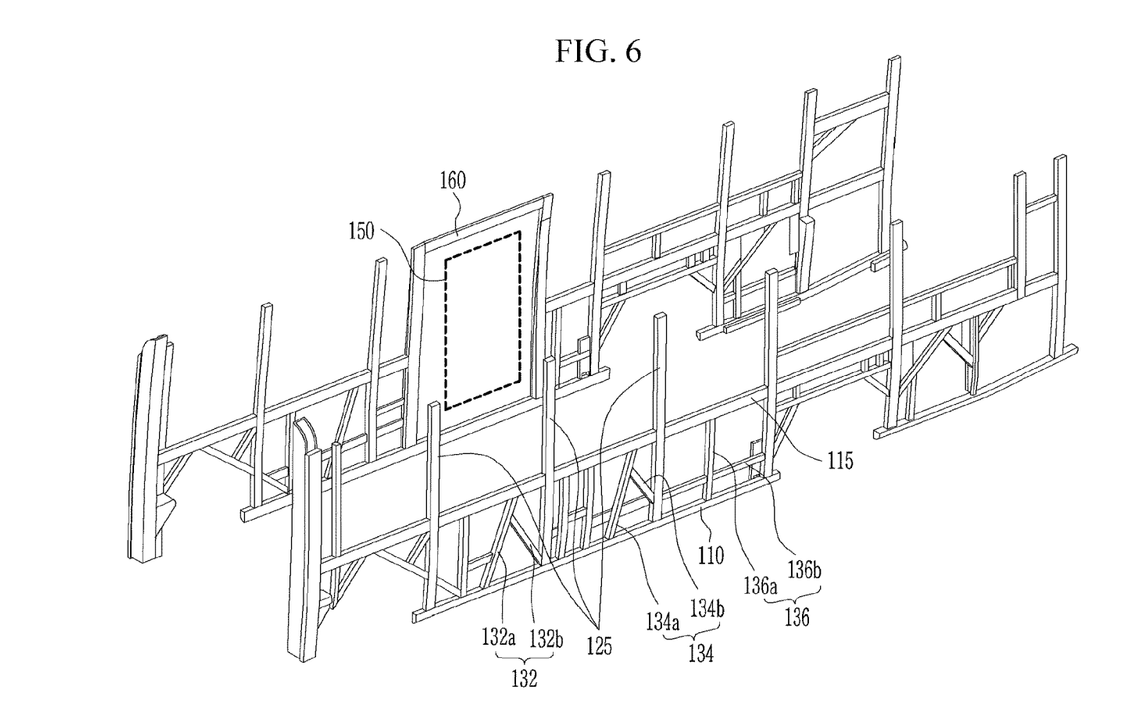
FIG. 6 is a perspective view of a side structure of a bus according to an exemplary embodiment of the present invention.

FIG. 6 is a perspective view of a side structure of a bus according to an exemplary embodiment of the present invention.

Referring to FIG. 6, in the side structure of the bus, the middle door frame (160) forming the middle door 150 is mounted at the right, the first region 132 is formed directly back the front wheel 100, the second region 134 is formed at the position corresponding to the middle door frame 160, and the third region 136 is formed directly before the rear wheel 105.

The first member 132a and the second member 132b are disposed in the first region 132, the third member 134a and the fourth member 134b are disposed in the second region 134, and the fifth member 136a and the sixth member 136b are disposed in the third region 136.

The first member 132a connects the skirt rail 110 and the waist rail 115, and the second member 132b connects the upper part of the first member 132a and the skirt rail 110. Also, the lower end of the second member 132b may be together coupled to the skirt rail 110 and the window filler 125.

The third member 134a may connect the skirt rail 110 and the waist rail 115, and the fourth member 134b may be coupled to the upper part of the third member 134a and the window filler 125.

Also, the fifth member 136a may connect vertically the skirt rail 110 and the waist rail 115, the sixth member 136b may connect the window fillers 125 disposed before and after, and the parts that cross to each other may be coupled to each other in the fifth and sixth members 136a and 136b.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A side structure of a bus comprising:
  a skirt rail disposed to extend in a fore and aft direction at a lower part of a vehicle body;
  window fillers connected to the skirt rail at lower ends, the window fillers extending in an upper side and arranged from a front to a rear with a predetermined interval;
  a waist rail extending from the front to the rear with a predetermined distance in the upper side of the skirt rail and engaged with each of the window fillers; and
  regions between the skirt rail, the waist rail, and the window fillers;
  wherein the regions include a first region adjacent a front wheel, a second region adjacent to a middle door disposed between the front wheel and a rear wheel, and a third region adjacent to the rear wheel;
  wherein the first region includes a first member connecting the waist rail and the skirt rail and a second member connecting an upper part of the first member and the lower end of the window filler;
  wherein the second region includes a third member connecting the waist rail and the skirt rail and a fourth member connecting an upper part of the third member and the lower part of the window filler; and
  wherein the third region includes a fifth member connecting the waist rail and the skirt rail and a sixth member connecting the window filler adjacent to each other in a front/rear direction.

2. The side structure of claim 1, wherein the first member extends from the lower side to the upper side.

3. The side structure of claim 2, wherein the first member is inclined toward the front of the vehicle body.

4. The side structure of claim 1, further comprising a roof rail extending from the front to the rear at an upper part with the predetermined distance for the waist rail, the roof rail connected to each upper end of the window fillers.

5. The side structure of claim 1, wherein the third member extends from the lower part to an upper part of the third member.

6. The side structure of claim 5, wherein the third member is inclined toward the front of the vehicle body.

7. The side structure of claim 1, wherein the fifth member is disposed in a vertical direction, and the sixth member is disposed in a horizontal direction.

8. The side structure of claim 7, wherein the fifth member and the sixth member are crossed in a crossed shape, and crossed parts thereof are coupled to each other.

9. The side structure of claim 7, wherein the fourth member connects lower parts of the window fillers at upper ends of the third member.

10. The side structure of claim 9, wherein the fourth member is inclined toward the rear of the vehicle body.

11. A bus comprising:
  a vehicle body
  a skirt rail disposed to extend in a fore and aft direction at a lower part of the vehicle body;
  window fillers connected to the skirt rail at lower ends, the window fillers extending in an upper side and arranged from a front to a rear with a predetermined interval;
  a waist rail extending from the front to the rear with a predetermined distance in the upper side of the skirt rail and engaged with each of the window fillers; and regions between the skirt rail, the waist rail, and the window fillers;

wherein the regions include a first region adjacent a front wheel, a second region adjacent to a middle door disposed between the front wheel and a rear wheel, and a third region adjacent to the rear wheel;

wherein the first region includes a first member connecting the waist rail and the skirt rail and a second member connecting an upper part of the first member and the lower end of the window filler;

wherein the second region includes a third member connecting the waist rail and the skirt rail and a fourth member connecting an upper part of the third member and the lower part of the window filler; and wherein the third region includes a fifth member connecting the waist rail and the skirt rail and a sixth member connecting the window filler adjacent to each other in a front/rear direction.

12. The bus of claim 11, wherein the bus is an ultra-low floor bus that does not have doorway stairs.

13. The bus of claim 11, wherein the first member extends from the lower side to the upper side and wherein the first member is inclined toward the front of the vehicle body.

14. The bus of claim 11, further comprising a roof rail extending from the front to the rear at an upper part with the predetermined distance for the waist rail, the roof rail connected to each upper end of the window fillers.

15. The bus of claim 11, wherein the third member extends from the lower part to an upper part of the third member and wherein the third member is inclined toward the front of the vehicle body.

16. The bus of claim 11, wherein the fifth member is disposed in a vertical direction, and the sixth member is disposed in a horizontal direction.

17. The bus of claim 16, wherein the fifth member and the sixth member are crossed in a crossed shape, and crossed parts thereof are coupled to each other.

18. The bus of claim 16, wherein the fourth member connects lower parts of the window fillers at upper ends of the third member and wherein the fourth member is inclined toward the rear of the vehicle body.

* * * * *